United States Patent

[11] 3,614,259

| [72] | Inventor | Joseph J. Neff<br>Columbus, Ind. |
|---|---|---|
| [21] | Appl. No. | 855,270 |
| [22] | Filed | Sept. 4, 1969 |
| [45] | Patented | Oct. 19, 1971 |
| [73] | Assignee | Cummins Engine Company, Inc.<br>Columbus, Ind. |

[54] TURBINE CASING
4 Claims, 5 Drawing Figs.

[52] U.S. Cl. .................................................. 415/205,
 415/219, 60/13, 415/151
[51] Int. Cl. ....................................................... F01d 1/02,
 F01k 23/14, F01d 25/24
[50] Field of Search ............................................ 60/13;
 415/205, 219, 203, 204, 206

[56] References Cited
UNITED STATES PATENTS

| 3,557,549 | 1/1971 | Webster ....................... | 415/205 |
| 3,178,882 | 4/1965 | Milligan ....................... | 60/13 |
| 3,218,029 | 11/1965 | Woollenweber, Jr. ......... | 415/205 |
| 3,270,495 | 9/1966 | Connor ......................... | 60/13 |
| 3,292,364 | 12/1966 | Cazier .......................... | 60/13 |
| 3,408,046 | 10/1968 | Woolenweber, Jr. .......... | 415/205 |
| 3,423,926 | 1/1969 | Nancarrow et al. .......... | 60/13 |

FOREIGN PATENTS

| 953,933 | 4/1964 | Great Britain ................. | 60/13 |
| 1,337,864 | 10/1963 | France .......................... | 415/145 |

*Primary Examiner*—Henry F. Raduazo
*Attorney*—Hibben, Noyes & Bicknell

ABSTRACT: A divided turbine casing for a gas turbine is disclosed, which may be used to provide either a pulse turbine or a variable speed turbine. When used as a pulse turbine, two separate flows of pulsating gas are supplied to the divided inlet portion of the casing. The pulses in the respective flows are transmitted by the casing to the turbine wheel with minimum energy loss. When used as a variable speed turbine, a valve is provided in the inlet portion of the casing to direct gas supplied to the inlet portion into one or the other or both parts of the divided inlet to provide different ranges of gas velocity at the turbine wheel and consequently different ranges of turbine speed.

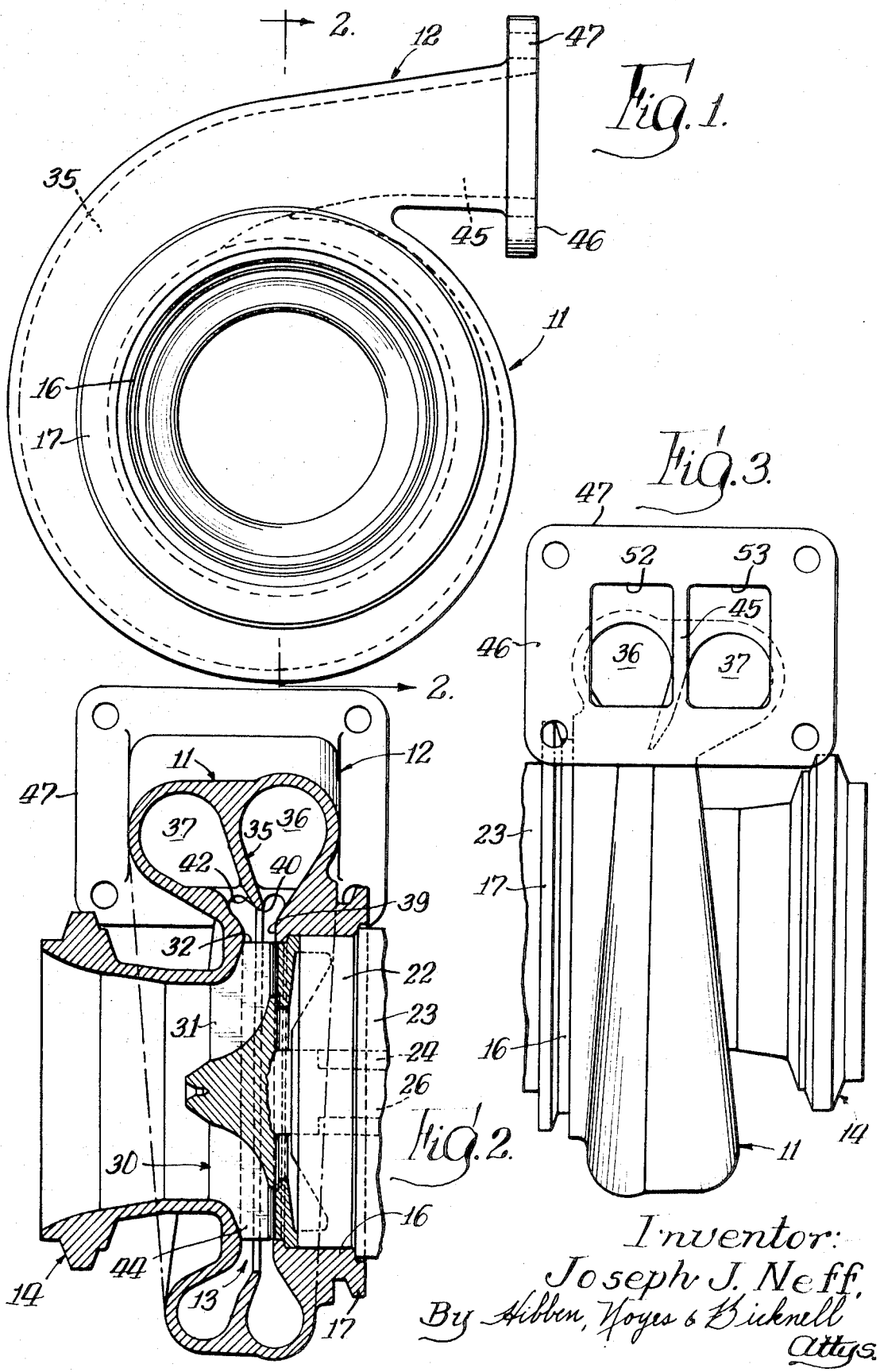

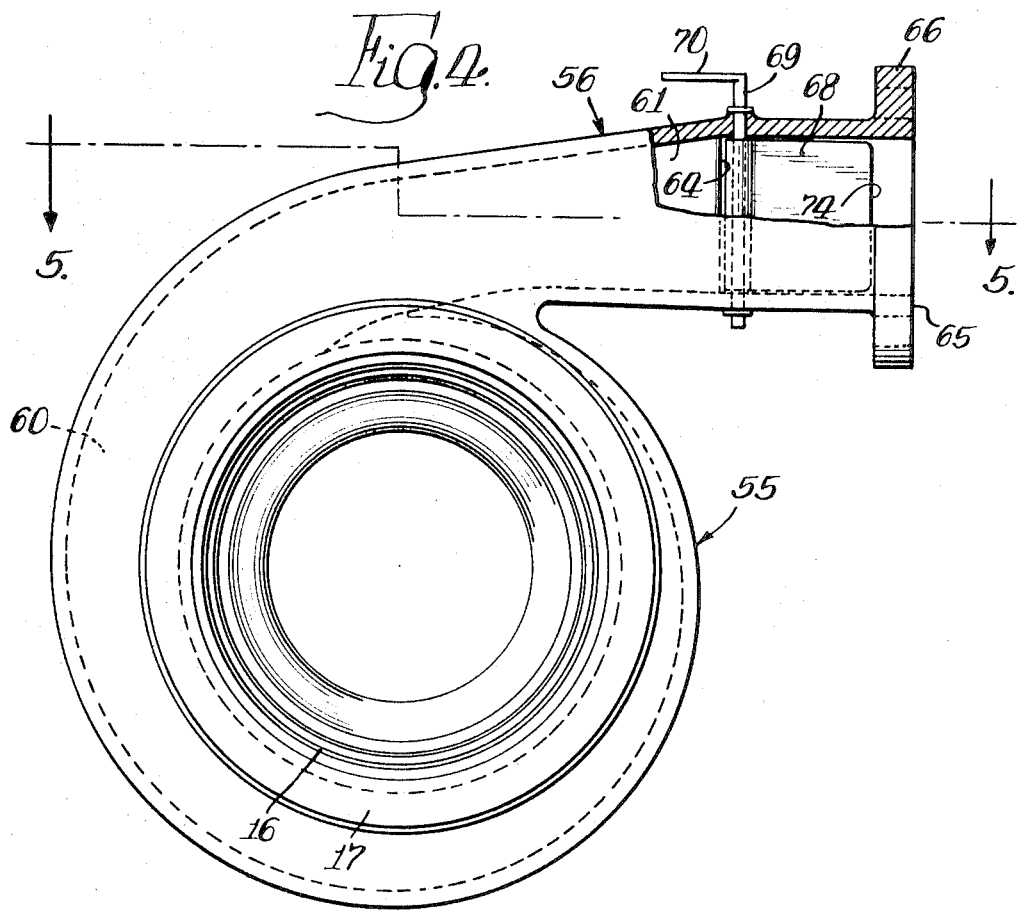
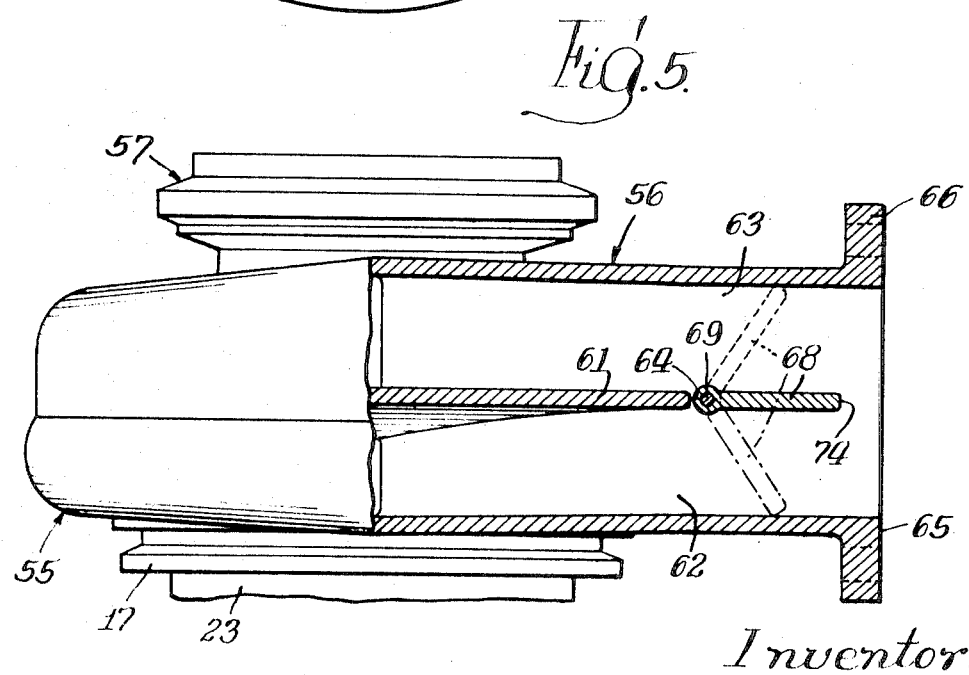

TURBINE CASING

This invention relates to turbines, and more particularly to a novel casing adapted for use in a gas turbine of the character utilized in a turbocharger for an internal combustion engine.

Due to the increased power and other advantages obtained from internal combustion engines utilizing exhaust gas driven turbochargers, greater use is being made of turbochargers than ever before. In recent years, the turbine casing of such turbochargers has undergone considerable development in order to more effectively utilize the energy in the exhaust gas and thereby increase the overall efficiency of the turbocharger and engine.

One type of turbine heretofore utilized in turbochargers adapted for use with internal combustion engines employing poppet-type exhaust valves, is the so-called "pulse" turbine. Such turbines have a casing designed to transmit the kinetic energy of the pulses in the exhaust gas flow from the engine, upon opening of the exhaust valves, to the turbine wheel with minimum energy loss. The casings of most of the pulse turbines presently in use have a partition dividing the casing into two parts so that the pulsating flow of exhaust gas from certain of the cylinders of the engine is directed into one part of the casing and the pulsating flow of exhaust gas from the other cylinders is directed into the other part of the casing. In a V-type engine, for example, the flow of exhaust gas from the cylinders of one bank would be supplied to one part of the divided turbine casing and the flow of exhaust gas from the cylinders of the other bank would be supplied to the other part of the casing.

The divided pulse turbine casings thus far advanced have not proved satisfactory for their intended purpose, for various reasons, one of which is reduced efficiency due to flow separation through the turbine wheel.

Another type of turbine heretofore utilized in turbochargers adapted for use with internal combustion engines, is the variable speed turbine. While variable speed turbines are generally old and well known, a variable speed turbine employing a divided turbine casing in connection with a valve to direct the flow of exhaust gas from the engine into one or both parts of the casing in order to vary the velocity of the flow of exhaust gas to the turbine wheel and hence the speed of the turbine, is a comparatively recent development.

The aforementioned variable speed turbine which employs a divided turbine casing, has not proved satisfactory for its intended purpose, for various reasons. One of the reasons for such unsatisfactory performance is loss of efficiency due to a partially filled turbine wheel entrance or throat, which results in expansion losses in the inducer blade area of the turbine wheel.

Accordingly, it is a general object of the present invention to provide a novel and improved divided turbine casing, having application either as a pulse or as a variable speed turbine for an exhaust gas driven turbocharger and which overcomes the aforementioned disadvantages.

Another object is to provide a novel divided turbine casing for a gas turbine adapted to be driven by a pulsating exhaust gas flow from an internal combustion engine, wherein the casing transmits the pulses in the exhaust gas flow to the associated turbine wheel with minimum energy loss.

Still another object is to provide a novel divided turbine casing adapted to be driven by pulsating exhaust gas flows from different groups of cylinders of a multicylinder internal combustion engine, wherein the pulses from one group of cylinders are prevented from adversely affecting the flow from another group of cylinders.

A further object is to provide a novel divided turbine casing and valve means for a gas turbine, wherein the valve means is effective to cause operation of the turbine at three different ranges of speed.

A still further object is to provide a novel turbine casing and valve means for the turbine of an exhaust gas driven turbocharger, wherein the turbine casing is divided into two parts of different size by a partition and wherein the valve means directs exhaust gas into one or the other or both parts of the casing to control the ranges of speed of the turbine.

Other objects and advantages will become apparent from the following detailed description and accompanying drawings, wherein:

FIG. 1 is an elevational view axially of a turbine casing embodying the invention;

FIG. 2 is a sectional view taken along the line 2—2 of FIG. 1, and showing the relationship of the casing to an associated turbine wheel;

FIG. 3 is an elevational view of the right side of the turbine casing as viewed in FIG. 1;

FIG. 4 is an elevational view of another turbine casing embodying the invention and similar to FIG. 1, but with a portion thereof broken away to show internal details; and FIG. 5 is a sectional view taken substantially along the line 5—5 of FIG. 4.

Briefly described, the present invention contemplates a novel turbine casing adapted to convey a flow of gas to an associated turbine wheel. The turbine casing, to be hereinafter described in detail, includes a volute portion adapted to surround the turbine wheel, an inlet portion connected to and extending generally tangentially toward the volute, and an annular throat adapted to direct the gas flow from the volute portion into the spaces between the blades of the turbine wheel for driving the latter. A partition is provided in the interior of the casing for dividing the volute portion into two parts of different radii from the axis of the casing to the centers of the cross-sectional areas of the respective parts, the partition being conical with respect to the axis of the turbine casing in the volute portion. The radially inner edge of the partition is positioned substantially at the outer periphery of the throat and is beveled on at least one side to prevent separation of the flow from the walls of the throat. In the inlet portion, the partition twists from a perpendicular position with respect to the axis of the casing to the conical form in the volute portion.

In one embodiment of the invention, the turbine casing is adapted to utilize the pulses in gas flows from two different groups of cylinders of an associated internal combustion engine, the turbine thus functioning as a pulse turbine. In such case, the two parts of the divided turbine casing are adapted to receive separate flows of pulsating exhaust gas from the respective groups of cylinders of the engine, and to transmit the pulses in the flows to an associated turbine wheel without any significant loss of energy and without any adverse affects on the respective flows. Such operation is obtained by connecting one of the divided inlet portions to one group of cylinders of the engine, and the other divided inlet portion to the other group of cylinders of the engine. The groups of cylinders are chosen so that the pulses in the flow from the one group do not enter the throat of the casing at the same time that the pulses in the flow from the other group enter the throat.

In another embodiment of the invention, the turbine casing is adapted to provide a variable speed turbine. In this case, valve means of the flapper type and forming a continuation of the partition, is provided in the inlet portion for directing the flow of exhaust gas from the cylinders of the engine into one or the other or both parts of the casing, depending upon the position of the valve. The valve means is arranged to be swung from one side to the other of the inlet portion of the casing and thus prevent flow through one or the other of the two parts of the casing, or to be centered in the inlet portion and thus permit flow through both parts of the casing. The two parts of the volute portion of the turbine casing have different A/R ratios, where "A" is the cross-sectional area of the respective parts at the start of the volute portion and "R" is the radius from the axis of the casing to the center of that cross-sectional area. Two different A/R ratios may, of course, be obtained by varying A or R or both. Thus, use of the respective parts will provide two different ranges of gas velocity at the periphery of the turbine wheel. When the two parts of the volute portion of the casing are used at the same time, another A/R ratio will be obtained, which is different from that obtained by use of either part alone. Consequently, another range of gas velocity may be obtained at the turbine wheel periphery. Thus, movement of the valve means to its various positions in the inlet portion of the casing will provide three different ranges of gas velocity at the periphery of the turbine wheel, and consequently three different ranges of turbine speed.

A turbine casing embodying the invention is adapted to be connected to a source of gas under pressure. In FIGS. 1, 2 and 3, a turbine casing is illustrated, which is adapted to be connected to a pulsating source of gas under pressure such as the exhaust flow from an internal combustion engine having poppet-type exhaust valves. Further, the turbine casing illustrated in these figures is divided into two parts which receive pulses from different groups of cylinders of the engine. Such casing comprises a volute portion 11, an inlet portion 12 which extends generally tangentially with respect to the volute portion 11, an annular throat 13 at the radially inner periphery of the volute portion, and an annular outlet portion 14 which extends axially outwardly from one side of the volute portion 11. In the present instance, the outlet portion 14 extends from the left side of the volute portion, as viewed in FIG. 2. The opposite or right side of the casing, as viewed in FIG. 2, includes an annular, axially extending mounting portion 16 having a radially outwardly extending flange 17 around the outer end thereof. The mounting portion 16 is adapted to telescope over one end 22 of a cylindrical member such as a bearing support housing 23 fragmentarily shown in FIGS. 2 and 3. A bearing 24, also fragmentarily shown in FIG. 2, is mounted in the housing 23, and a shaft 26 is rotatably journaled in the bearing 24.

A turbine wheel 30 having a plurality of radially extending, circumferentially spaced blades 31, is shown mounted on the left end of the shaft 26 for driving the latter. Thus, when the turbine casing is mounted on the support housing 23 so that the turbine wheel 30 is surrounded by the volute portion 11 and gas under pressure is being supplied to the inlet portion 12 of the casing, gas from the throat 13 of the turbine casing will flow radially inwardly into the spaces between the blades 31 at the radially outer ends 32 thereof, and then gradually changes direction from substantially radial to substantially axial before discharging through the outlet portion 14 of the casing.

If the turbine casing is to be used to provide the turbine portion of an exhaust gas driven turbocharger, a compressor wheel (not shown) is secured to the opposite end of the shaft 26 and a compressor casing (also not shown) is mounted on the opposite end of the bearing support housing 23. The support housing 23, shaft 26, turbine wheel 30, compressor and compressor casing form no part of the present invention, and therefore no further description thereof will be included.

The turbine casing illustrated in FIGS. 1, 2 and 3 is effective to transmit pulsations in two separate streams of gas flowing to the casing and to transmit the pulses in the streams to the turbine wheel 31 without any significant loss of energy and without any adverse affects between the respective streams such as the pulses in one stream tending to oppose the other stream. In other words, the turbine casing illustrated in FIGS. 1, 2 and 3, is effective, when used in conjunction with an appropriate turbine wheel, to provide a highly efficient pulse turbine.

An example of one source of pulsating gas to which the turbine casing illustrated in FIGS. 1, 2 and 3 is particularly adapted, is the exhaust system of an internal combustion engine utilizing poppet-type exhaust valves and having two exhaust conduits respectively, extending from different groups of cylinders of the engine. The groups of cylinders are chosen so that the pulses in the flow from one group will not interfere with the pulses in the flow from the other group, as the pulses enter the casing. An engine of this character is a V-type internal combustion engine, where connections are made so that exhaust gas from the cylinders of one bank of the engine is supplied to one part of the casing, and exhaust gas from the cylinders of the other bank is supplied to the other part of the casing. If the turbine casing is to be connected to the exhaust system of an in-line engine, as, for example, an eight-cylinder engine, connections are made so that exhaust gas from four cylinders of the engine is supplied to one part of the casing and exhaust gas from the other four cylinders is supplied to the other part of the casing.

As shown in FIGS. 2 and 3, the volute portion 11 is divided into two parts, indicated at 36 and 37, by an internal partition 35. While the parts 36 and 37 may be of equal size, they are preferably of different size. In the present instance, at any point the part 36 is of greater cross-sectional area and average radius than the part 37. Stated another way, the cross-sectional area of the part 36 is greater than the cross-sectional area of the part 37, and the radius from the axis of the casing to the center of the cross-sectional area of the part 36 is of greater length than the radius from the axis of the casing to the center of the cross-sectional area of the part 37 in any radial plane through the volute portion 11. Specifically, the ratio of the cross-sectional area to said radius for the part 36, when measured at the start of the volute portion 11, is equal to the ratio of the cross-sectional area to said radius for the part 37.

With the two parts 36 and 37 positioned relative to the throat 13 as they are shown in FIG. 2, in order to assure that the flows of gas from the parts 36 and 37 completely fill the throat 13 before reaching the wheel 30, the partition 35 is inclined with respect to a plane perpendicular to the axis of the casing. Thus, the partition 35 slants toward the right-hand wall, indicated at 39, of the throat 13 from the radially outer periphery of the partition toward the radially inner periphery thereof. The partition 35 is therefore conical, rather than flat in form. Loss of efficiency due to expansion of gas in the inducer blade area of the turbine wheel 30, that is, the area between the radially outer ends 32 of the blades 31, is minimized by terminating the partition 35 substantially at the outer periphery or entrance of the throat 13 which is preferably of uniform radial dimension. Filling of the throat 13 by the flow of gas from the part 37 is further assured by beveling as at 42 the left side of the partition 35, as viewed in FIG. 2, at the radially inner edge thereof, indicated at 40. In other words, since the partition 35 is conical, the beveling 42 is on the inner side of the cone.

Such arrangement permits the gas flow from either the part 36, the part 37, or both parts, to expand throughout the radial length of the inducer blade area of the turbine wheel. If the partition 35 were to extend through the throat 13 and up to a point adjacent the outer ends 32 of the turbine blades 31, substantial losses in efficiency due to expansion of the gas in the inducer blade area of the turbine wheel would result.

In order to maintain the pulses in the flows separate in the inlet portion 12 of the turbine casing illustrated in FIGS. 1, 2 and 3, the inlet portion is also divided. Thus, the partition 35 is extended as at 45 through the inlet portion 12 of the casing and terminates flush with the outer surface, indicated at 46, of a mounting flange 47 at the outer end of the inlet portion 12. The extension 45 of the partition 35 thus divides the inlet portion 12 into two parts, indicated at 52 and 53 in FIG. 3, which form continuations of the parts 36 and 37, respectively, of the divided volute portion 11.

As best shown in FIG. 3, the configuration of each of the parts 52 and 53 of the inlet portion is substantially rectangular in the plane of the outer surface 46 of the mounting flange 47, and the end of the extension 45 at this plane is perpendicular with respect to the axis of the casing. Thus, the cross-sectional shape of the parts 52 and 53 of the inlet portion 12 undergoes a smooth transition from the rectangular configuration thereof shown in FIG. 3 to the cross-sectional configuration of the parts 36 and 37 of the volute portion 11, through the length of the inlet portion 12. Since the partition 35 is inclined or slanted with respect to a plane perpendicular to the axis of the casing in the volute portion 11, and since the outer end of the extension 45 is perpendicular to the axis of the casing, the extension 45 twists in the inlet portion 12.

From the foregoing description, it will be apparent that the turbine casing illustrated in FIGS. 1, 2 and 3 will transmit the pulses in two separate flows of pulsating gas supplied to the inlet portion 12 thereof, to the associated turbine wheel 30, without any significant loss of energy and without any adverse affects between the respective flows. The foregoing is achieved as a result of the partition 35 in the volute portion 11 of the casing and the extension 45 of the partition in the inlet portion 12, which maintain the pulses in the flows separate until the pulses reach the throat 13. Further, the inclined relation of the partition 35 in the volute portion 11 of the casing assures that the throat 13 is filled by the flows of gas from the parts 36 and 37 of the volute portion 11. Such filling of the throat by the flow of gas from the part 37 of the volute portion 11 is further assured by the beveled left side 42 of the partition, at the radially inner edge of the partition. The turbine casing illustrated in FIGS. 1, 2 and 3 also minimizes efficiency losses due to expansion of gas in the inducer blade area of an associated turbine wheel, such as the turbine wheel 30, by reason of the termination of the partition 35 substantially at the outer periphery or entrance of the throat 13.

In FIGS. 4 and 5, another turbine casing embodying the invention is illustrated. The turbine casing illustrated in FIGS. 4 and 5 is adapted to be connected to a source of gas under pressure, such as the exhaust from an internal combustion engine, and to convey such gas to an associated turbine wheel at different ranges of velocity so as to provide a variable speed turbine. Specifically, the turbine casing illustrated in FIGS. 4 and 5 is adapted to provide the turbine portion of an exhaust gas driven turbocharger, and to cause the turbine to be operated at three different ranges of speed. To achieve this, a partition is provided in the volute portion of the turbine casing to divide the casing into two parts of different size. The partition extends into the inlet portion of the casing, and valve means is provided in the inlet portion upstream from the partition extension for selectively directing gas supplied to the inlet of the casing into one or the other or to both parts of the volute portion. The turbine casing will thus provide a turbine which may be operated at a selected one of three different ranges of speed, depending upon the position of the valve means in the inlet portion. If only two different ranges of speed are desired, the two parts of the casing may be of equal size.

As will be apparent from FIGS. 4 and 5, the turbine casing illustrated in these figures is generally similar to the turbine casing illustrated in FIGS. 1, 2 and 3, in that the casing of FIGS. 4 and 5 includes a volute portion 55, an inlet portion 56, which extends generally tangentially with respect to the volute portion 55, an annular throat (not shown) at the radially inner periphery of the volute portion 55, and an annular outlet portion 57 which extends axially outwardly from one side of the volute portion 55. The opposite side of the casing, as shown in FIG. 5, is substantially the same as that shown in FIG. 2.

The turbine casing shown in FIGS. 4 and 5 is also similar to the turbine casing illustrated in FIGS. 1, 2 and 3, in that it is divided into two parts by an internal partition 60 (FIG. 4). While the two parts of the casing may be of equal size, they are preferably of different size. In other words, the two parts of the casing illustrated in FIGS. 4 and 5 are preferably dimensioned so that the ratios of the cross-sectional areas of the parts of the volute portion 55 to the radii from the axis of the casing to the centers of the respective cross-sectional areas in any radial plane through the volute portion are different. The partition 60 of the casing shown in FIGS. 4 and 5 is shaped in the same manner as the partition 35 of the previous embodiment. In other words, the partition 60 is also conical, rather than flat, in form.

As heretofore mentioned, the turbine casing illustrated in FIGS. 4 and 5 is adapted to provide a variable speed turbine. To this end, the inlet portion 56 differs from the inlet portion 12 of the turbine casing shown in FIGS. 1, 2 and 3, in that the partition 60 includes an extension, indicated at 61, which divides the inlet portion 56 into two parts 62 and 63 (FIG. 5). However, the extension 61 does not extend completely through the inlet portion, but terminates as at 64 inwardly from the outer surface, indicated at 65, of a mounting flange 66 at the outer or inlet end of the inlet portion 56.

To direct gas into one or the other or both of the parts 62, 63 of the inlet portion 56, valve means in the form of a flapper valve 68 of platelike form is pivotally mounted in the upstream end of the inlet portion 56 by means of a shaft 69 fixedly secured in the downstream edge of the flapper valve 64. The shaft 69 is rotatably journaled in the inlet portion 56, and a laterally extending arm 70 may be provided on one outwardly projecting end of the shaft to rotate the shaft and swing the valve 68. The length of the valve 68 is greater than the distance from the axis of rotation of the shaft 69 to the opposite inner surfaces of the walls of the inlet portion 56. Consequently, the valve 68 may be swung in either direction until the upstream edge thereof, indicated at 74, contacts one or the other of the walls of the inlet portion 56. Thus, depending upon the position of the valve 68, gas may flow into one or the other or both parts 62, 63 of the inlet portion 56.

In certain engines, it is desirable to provide a torque rise with decreasing engine speed. For such a torque rise, it is necessary to increase the volume of air supplied by the turbocharger to the engine over that which would normally be supplied to the engine by the turbocharger with decreasing engine speed. With the structure just described and shown in FIGS. 4 and 5, the requisite increase in speed of the turbine and hence of the turbocharger in order to provide the aforementioned increased volume of air is achieved by increasing the velocity of the exhaust gas flowing to the wheel of the turbine with decreasing engine speed.

From the foregoing description, it will be apparent that the turbine casing illustrated in FIGS. 4 and 5 will convey gas under pressure, such as exhaust gas from the cylinders of an internal combustion engine, to an associated turbine wheel at different ranges of velocity so as to provide a variable speed turbine. Since the size of the parts of the volute portion 55 of the turbine casing illustrated in FIGS. 4 and 5 are different, the turbine casing illustrated therein is capable of providing three different ranges of gas velocity for the associated turbine wheel and consequently three different ranges of turbine speed. Selection of a particular one of the three different ranges of speed to suit a particular operating condition of the associated engine, is easily achieved by swinging the valve 68 between any one of the full-line or two broken-line positions thereof shown in FIG. 5, so as to cause the gas supplied to the inlet portion 56 of the casing to be directed into one or the other or both parts 62 and 63 of the inlet portion.

I claim:

1. A turbine casing adapted for a turbine wheel having a plurality of circumferentially spaced blades, said casing comprising a volute portion adapted to surround said wheel and having a radially extending vaneless annular throat open throughout its length and adapted to communicate with the spaces between said blades, and an annular partition extending generally radially throughout said volute portion and dividing the latter into two parts, said partition having a radially inner edge positioned substantially at the outer periphery of said throat, whereby a flow of gas from one or the other or both of the parts of said volute portion fills said throat before entering the spaces between said blades for driving said wheel.

2. The turbine casing of claim 1, in which said partition is conical and the radially inner edge of said partition is beveled on the inner side of the cone.

3. The turbine casing of claim 1, in which the cross-sectional area of one of the parts of said volute portion is greater than the cross-sectional area of the other of said parts, and the radius from the axis of the casing to the center of the cross-sectional area of said one part is greater than the radius from the axis of the casing to the center of the cross-sectional area of the other part of said volute portion such that the ratio of the cross-sectional area to the radius of said one part at the upstream end thereof is substantially equal to the ratio of the cross-sectional area to the radius of said other part at the upstream end thereof.

4. The turbine casing of claim 1, including an inlet portion extending generally tangentially to said volute portion, and said partition extending not only throughout said volute portion but also into said inlet portion and dividing the latter into two parts.